United States Patent
Takeda et al.

(10) Patent No.: US 9,986,035 B2
(45) Date of Patent: May 29, 2018

(54) SYNCHRONOUS MEASUREMENT SYSTEM

(71) Applicant: SEIKO EPSON CORPORATION, Tokyo (JP)

(72) Inventors: Kazuyoshi Takeda, Chino (JP); Takao Katayama, Matsumoto (JP); Mikimoto Jin, Chino (JP)

(73) Assignee: Seiko Epson Corporation (JP)

( * ) Notice: Subject to any disclaimer, the term of this patent is extended or adjusted under 35 U.S.C. 154(b) by 274 days.

(21) Appl. No.: 14/772,509

(22) PCT Filed: Mar. 3, 2014

(86) PCT No.: PCT/JP2014/001122
§ 371 (c)(1),
(2) Date: Sep. 3, 2015

(87) PCT Pub. No.: WO2014/136420
PCT Pub. Date: Sep. 12, 2014

(65) Prior Publication Data
US 2016/0036916 A1    Feb. 4, 2016

(30) Foreign Application Priority Data

Mar. 7, 2013  (JP) ................................. 2013-045158

(51) Int. Cl.
*H03B 5/36* (2006.01)
*H04L 29/08* (2006.01)
*H04L 12/46* (2006.01)

(52) U.S. Cl.
CPC ............ *H04L 67/12* (2013.01); *H04L 12/462* (2013.01)

(58) Field of Classification Search
CPC .............................. H04L 67/12; H04L 12/462
See application file for complete search history.

(56) References Cited

U.S. PATENT DOCUMENTS

| | | | |
|---|---|---|---|
| 9,432,298 B1* | 8/2016 | Smith | ................ H04L 49/9057 |
| 2003/0016770 A1* | 1/2003 | Trans | ...................... H04B 1/00 375/346 |
| 2003/0093187 A1* | 5/2003 | Walker | ................... B64C 13/20 701/1 |

(Continued)

FOREIGN PATENT DOCUMENTS

| JP | H07-167651 A | 7/1995 |
|---|---|---|
| JP | 2004-080132 A | 3/2004 |

(Continued)

*Primary Examiner* — Laura Menz
(74) *Attorney, Agent, or Firm* — Harness, Dickey & Pierce, P.L.C.

(57) ABSTRACT

A synchronous measurement system includes a main controller, a plurality of sub-controllers connected to the main controller, and a plurality of sensor units connected to the sub-controller. The sub-controllers include a sub-controller master and a sub-controller slave connected to the sub-controller master. The main controller transmits a start command to the sub-controller master. The sub-controller master generates a trigger signal according to reception of the start command and transmits the trigger signal to the sub-controller slave. Each of the plurality of sub-controllers transmits a synchronization command to the plurality of sensor units on the basis of the trigger signal.

9 Claims, 7 Drawing Sheets

(56) References Cited

U.S. PATENT DOCUMENTS

| | | | |
|---|---|---|---|
| 2005/0209719 A1* | 9/2005 | Beckert | B60R 16/0315 700/94 |
| 2008/0122938 A1* | 5/2008 | Broberg | G08B 25/01 348/222.1 |
| 2008/0310850 A1* | 12/2008 | Pederson | G07C 9/00158 398/135 |
| 2009/0187282 A1* | 7/2009 | Menke | F03D 7/0224 700/287 |
| 2010/0071466 A1* | 3/2010 | Kanai | G01C 19/56 73/504.02 |
| 2010/0268849 A1* | 10/2010 | Bengtson | G05B 15/02 709/248 |
| 2012/0244905 A1* | 9/2012 | Zhao | H04L 5/001 455/517 |
| 2014/0343886 A1* | 11/2014 | Berinato | G05B 23/0256 702/123 |
| 2015/0312350 A1* | 10/2015 | Kauppila | H04J 3/0638 709/248 |
| 2015/0318014 A1* | 11/2015 | Wilson | G11B 20/10027 360/46 |
| 2015/0318030 A1* | 11/2015 | Wilson | G06F 3/06 711/106 |
| 2015/0341874 A1* | 11/2015 | Nguyen-Dang | H04W 52/0209 370/350 |
| 2016/0036544 A1* | 2/2016 | Katayama | H04L 67/0658 702/89 |
| 2016/0036916 A1* | 2/2016 | Takeda | H04L 67/12 702/89 |
| 2016/0126822 A1* | 5/2016 | Lyle | H02M 1/088 363/123 |
| 2016/0197560 A1* | 7/2016 | Leedham | H04L 12/40013 363/78 |
| 2016/0311328 A1* | 10/2016 | Kim | B60L 11/18 |
| 2016/0330278 A1* | 11/2016 | Katayama | H04L 67/12 |
| 2016/0330793 A1* | 11/2016 | Zhuge | G06F 1/12 |
| 2017/0041127 A1* | 2/2017 | Sharpe-Geisler | H04L 7/0012 |

FOREIGN PATENT DOCUMENTS

| | | | | |
|---|---|---|---|---|
| JP | 2004080132 A | * | 3/2004 | |
| JP | 2008-252882 A | | 10/2008 | |
| JP | 2009229171 A | * | 10/2009 | G01C 19/56 |
| JP | 2014175755 A | * | 9/2014 | H04L 12/462 |
| WO | WO-2009-066622 A1 | | 5/2009 | |
| WO | WO 2014136420 A1 | * | 9/2014 | H04L 12/462 |

* cited by examiner

[Fig. 1]
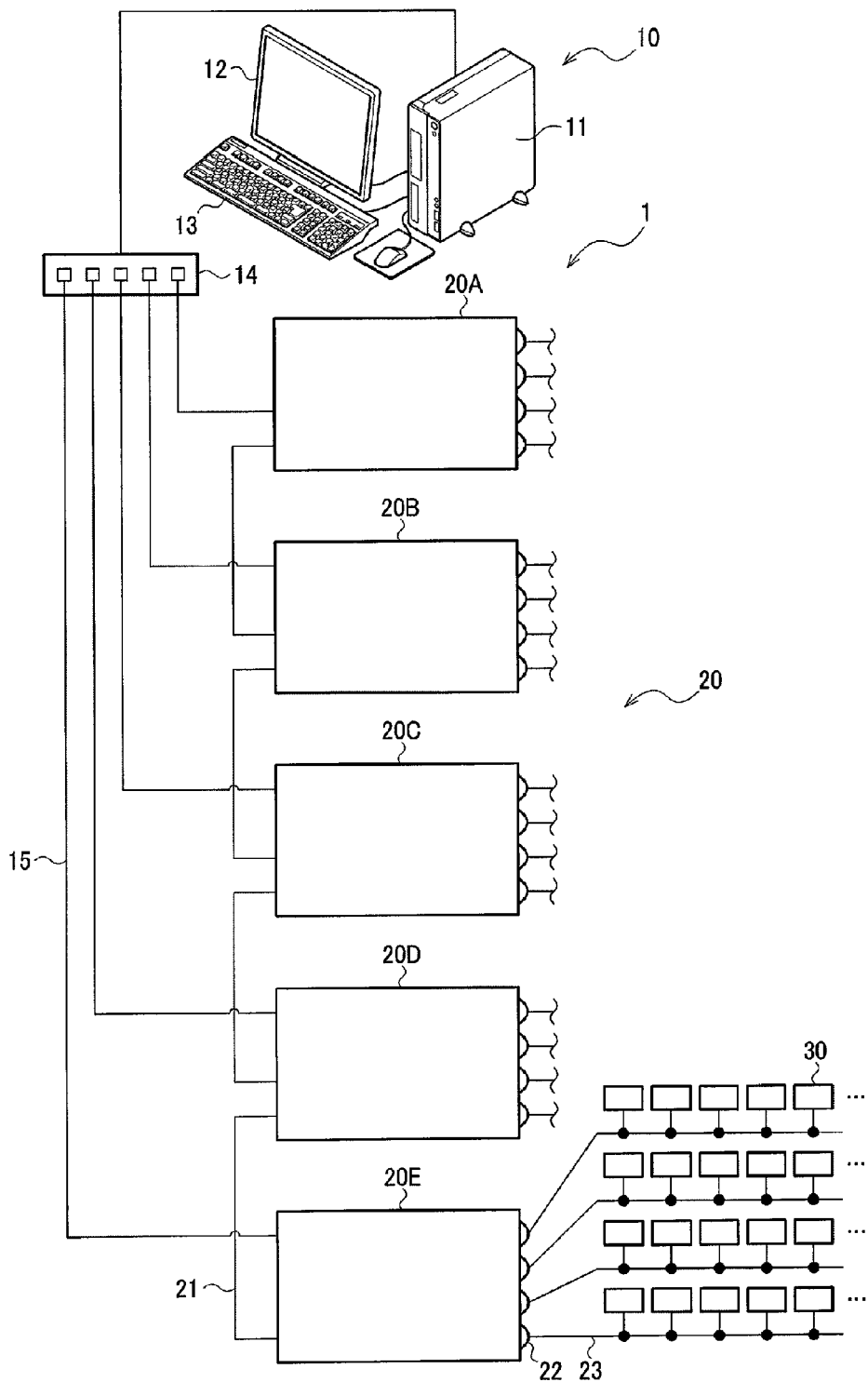

[Fig. 2]
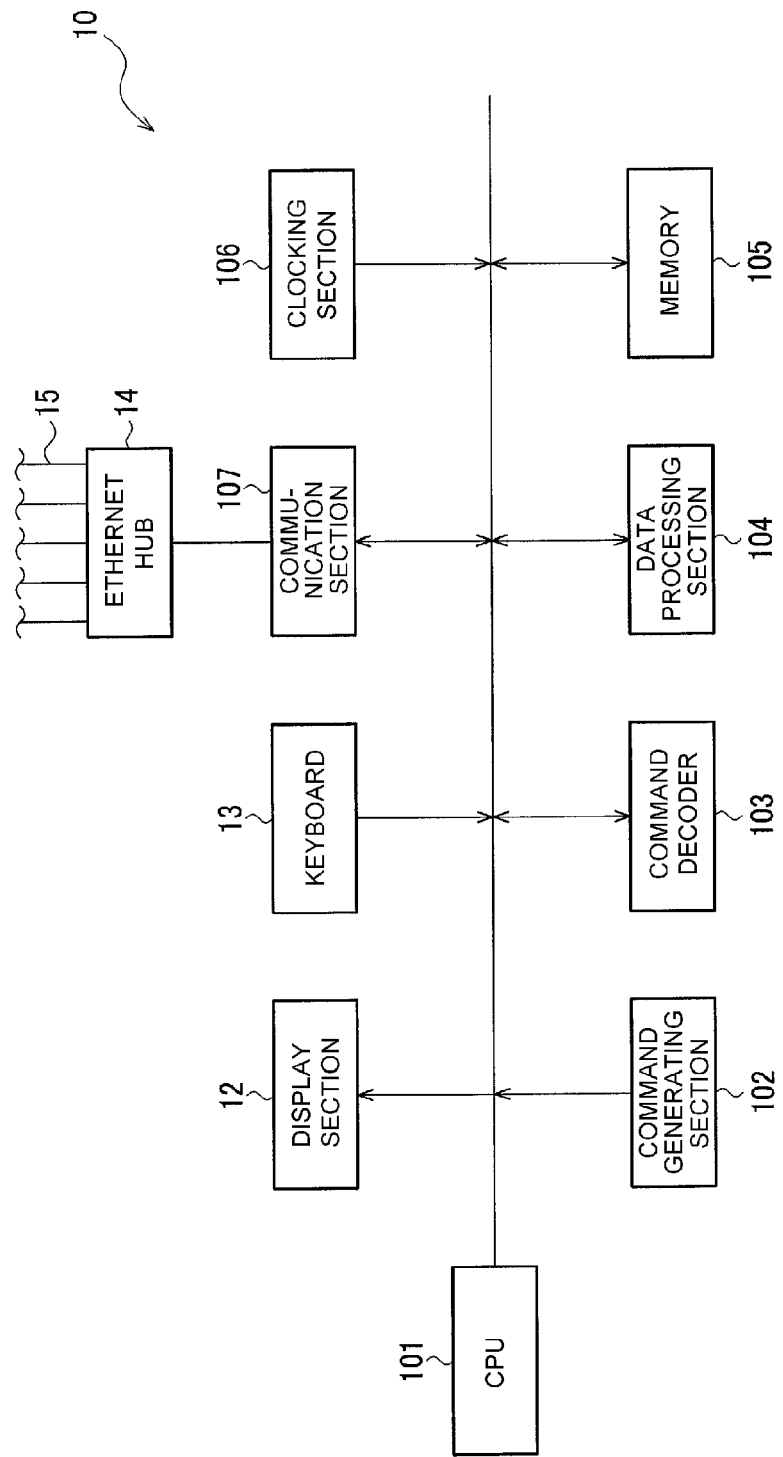

[Fig. 3]
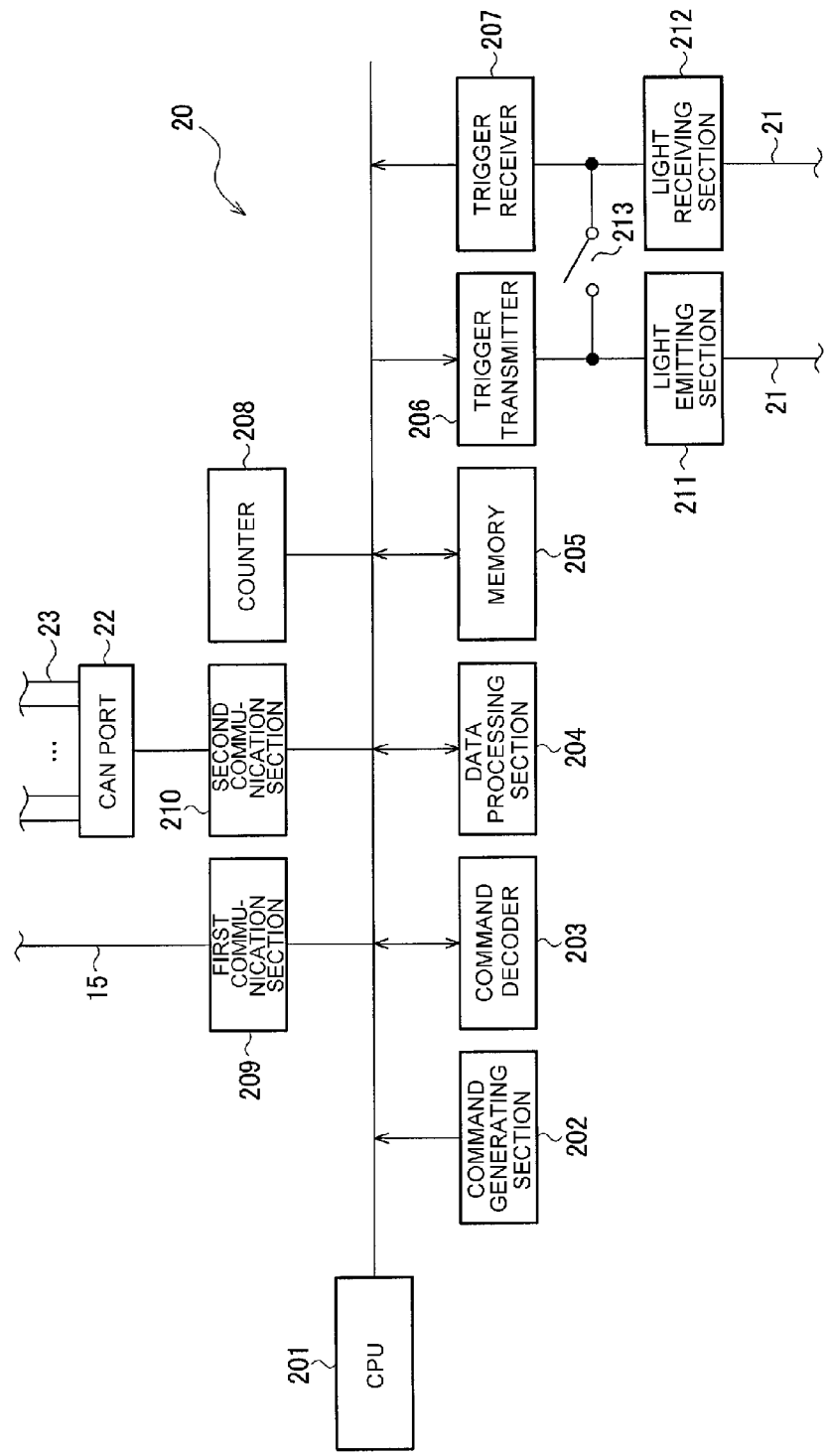

[Fig. 4]
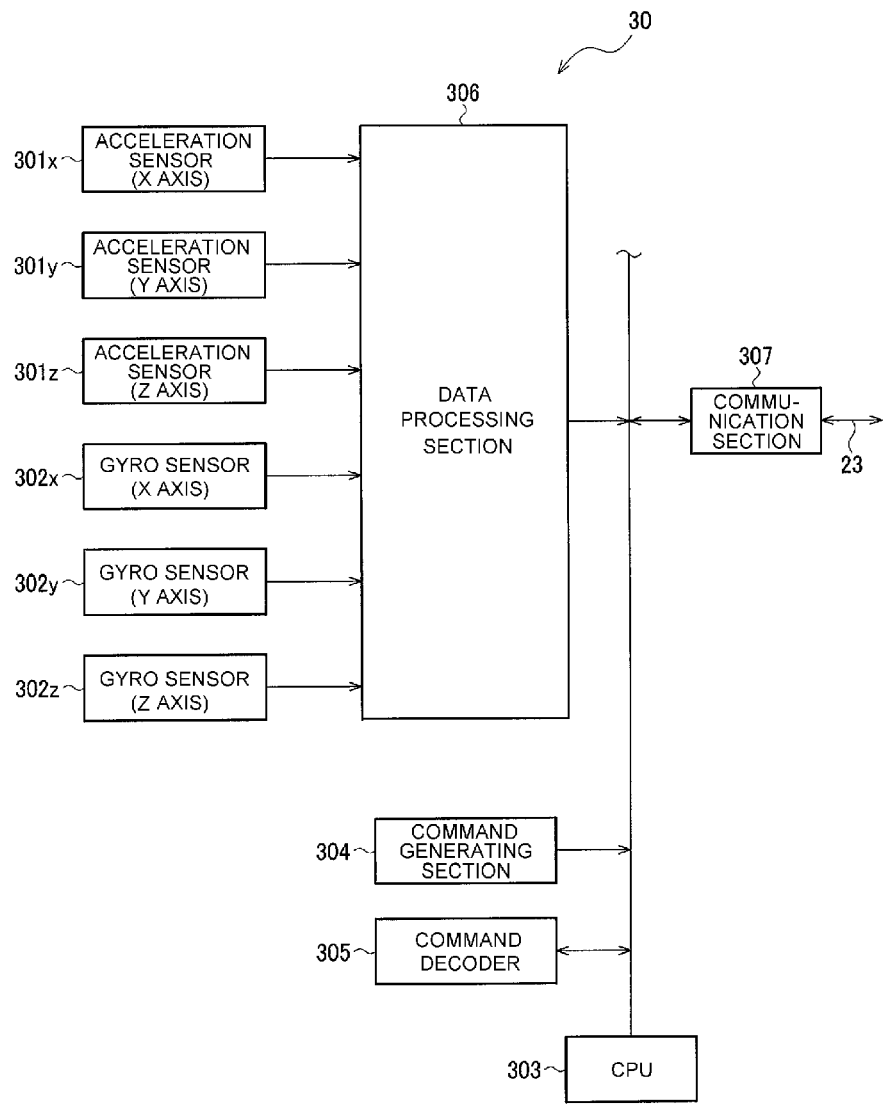

[Fig. 5]
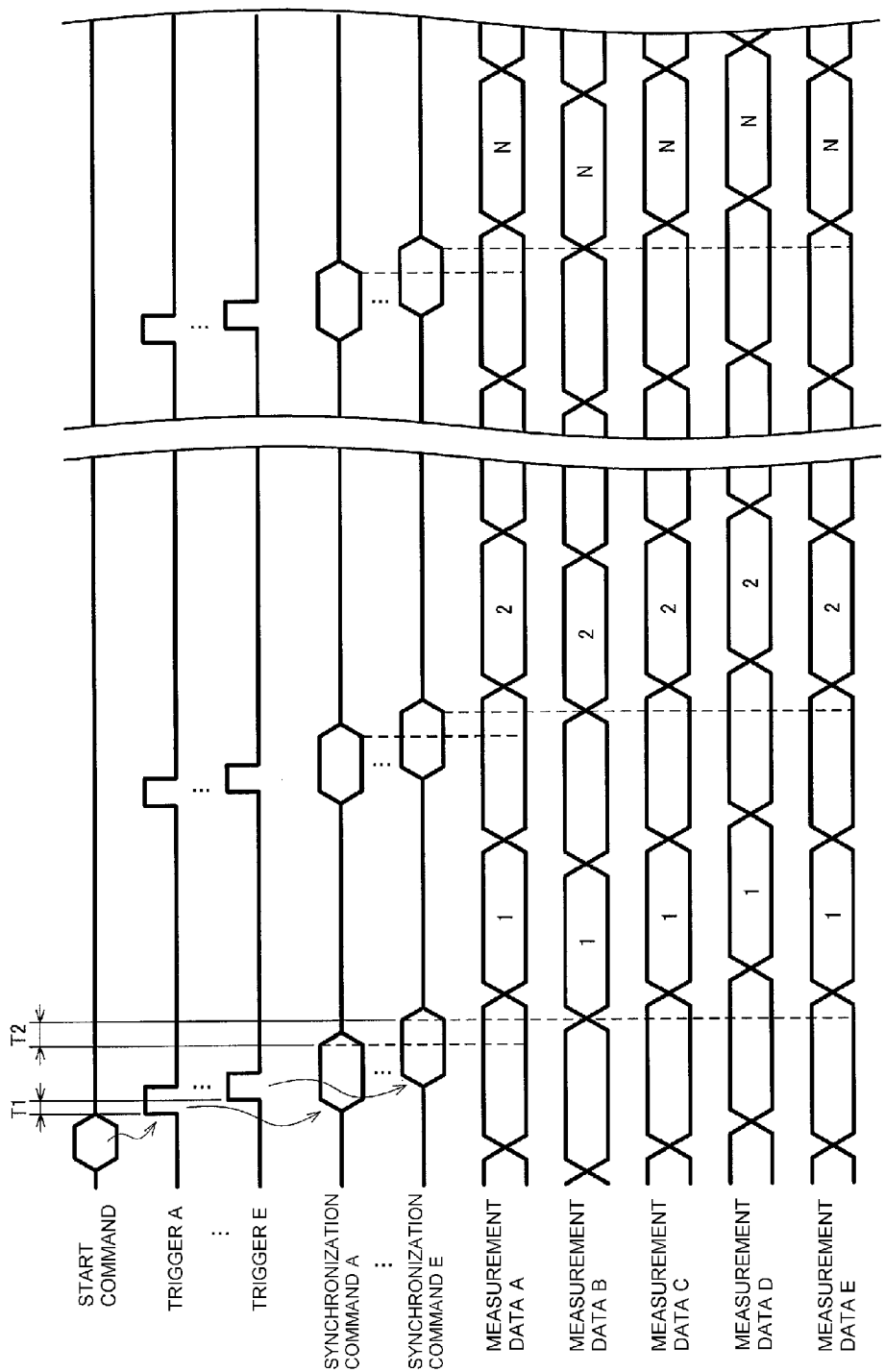

[Fig. 6A]
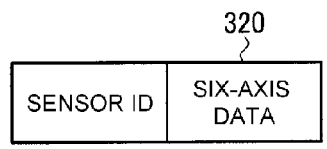
[Fig. 6B]
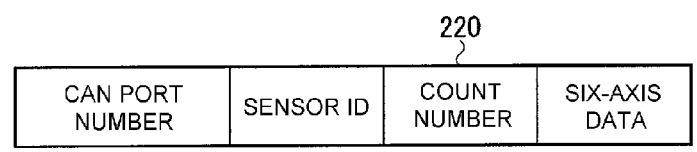
[Fig. 6C]
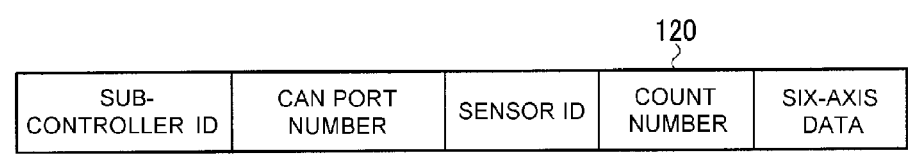

[Fig. 7]
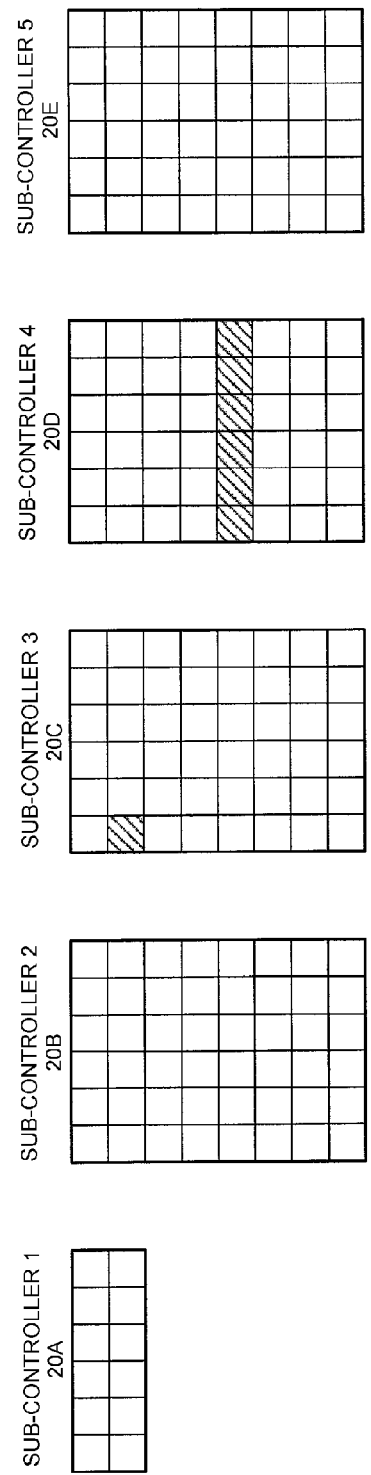

ional Application No. PCT/JP2014/001122, filed on Mar. 3, 2014. This application claims priority to Japanese Patent Application No. 2013-045158, filed Mar. 7, 2013. The entire disclosures of both of the above applications are expressly incorporated by reference herein.

SYNCHRONOUS MEASUREMENT SYSTEM

CROSS-REFERENCE TO RELATED APPLICATIONS

This application is a U.S. National Phase application under U.S.C. 371 of International Application No. PCT/JP2014/001122, filed on Mar. 3, 2014. This application claims priority to Japanese Patent Application No. 2013-045158, filed Mar. 7, 2013. The entire disclosures of both of the above applications are expressly incorporated by reference herein.

TECHNICAL FIELD

The present invention relates to a synchronous measurement system and the like.

BACKGROUND ART

A plurality of sensor units are sometimes mounted on an object to be detected to measure various kinds of information such as the movement, the posture, and the distortion of the object to be detected. In this case, data collected from the respective plurality of sensor units need to be synchronized with one another.

In JP-A-2004-80132, for example, for synchronous detection of communication, a master communication circuit and a plurality of slave communication circuits are prepared. When the master communication circuit communicates with one of the plurality of slave communication circuits, the master communication circuit updates count data for the start of synchronization and synchronous detection in such a manner as 0, 1, 2, . . . and transmits the count data in addition to communication data. Each of the plurality of slave communication circuits can obtain synchronization timing of communication by receiving the count data. Even if the slave communication circuit fails to receive the count data because of some reason, since the synchronization timing can be obtained according to the next update of the count data, the master communication circuit does not need to retry the transmission of the count data.

SUMMARY OF THE INVENTION

Technical Problem

The synchronous detection system of PTL 1 can be referred to as centralized type. This is because synchronization of communication is solely managed by the master communication circuit in a centralized manner according to the transmission of the count data from the master communication circuit.

In the case of the centralized type, since a communication path is a communication path capable of performing advanced communication, there is a problem in that synchronization accuracy is deteriorated by uncertainty of a synchronization command communication time in the communication path.

In JP-A-2004-80132, communication between the master communication circuit and the slave communication circuit is synchronized. The plurality of sensor units are not simultaneously synchronized.

Solution to the Problem

An advantage of some aspects of the invention is to provide a highly accurate synchronous measurement system that can reduce a load on a main controller and can simultaneously synchronize a plurality of sensor units according to distributed processing in a plurality of sub-controllers.

(1) An aspect of the invention relates to a synchronous measurement system including: a main controller; a plurality of sub-controllers connected to the main controller; and a plurality of sensor units connected to each of the plurality of sub-controllers. The plurality of sub-controllers include: a sub-controller master; and a sub-controller slave connected to the sub-controller master. The main controller transmits a start command to the sub-controller master. The sub-controller master generates a trigger signal according to reception of the start command and transmits the trigger signal to the sub-controller slave. The plurality of sub-controllers transmits a synchronization command to the plurality of sensor units on the basis of the trigger signal.

In the aspect of the invention, the sub-controller master, which receives the start command from the main controller, generates the trigger signal and transmits the trigger signal to the sub-controller slave. Each of the plurality of sub-controllers (the sub-controller master and the sub-controller slave) transmits the synchronization command to the plurality of sensor units on the basis of the trigger signal. Consequently, all the sensor units connected to all the sub-controllers can be simultaneously synchronized. Moreover, the main controller is not involved in synchronous detection after transmitting the start command. Each of the plurality of sub-controllers can perform the synchronous detection in a distributed manner.

(2) The aspect of the invention may be configured such that the start command includes information concerning the number of times of measurement, and the sub-controller master repeatedly generates the trigger signal by the number of times of measurement according to the reception of the start command.

Then, even when each of the plurality of sensor units continuously measures a plurality of measurement data, the main controller only has to transmit the start command only once. It is possible to substantially reduce time in which the main controller is involved in the synchronous detection. Note that the information concerning the number of times of measurement may be transmitted following the start command.

(3) The aspect of the invention may be configured such that the start command includes information concerning a measurement interval. Consequently, it is possible to designate, according to the start command, an interval of measurement repeated by the number of times of measurement. In this case, as in the case explained above, the information concerning the number of times of measurement and the measurement interval may be transmitted following the start command.

(4) The aspect of the invention may be configured such that a plurality of the sub-controller slaves are provided, and the plurality of sub-controller slaves are connected to the sub-controller master in series. Then, even if the number of sub-controller slaves increases, the sub-controller master and the plurality of sub-controller slaves only have to be connected in series. Cable laying and the like are easy compared with the star type connection.

(5) The aspect of the invention may be configured such that the trigger signal is a digital signal. Then, synchronization timing can be determined by an edge of a binarized digital signal.

In this case, it is possible to provide, in the sub-controller slave provided halfway in daisy chain connection, a buffer or the like that waveform-shapes the digital signal and improve synchronization accuracy.

(6) The aspect of the invention may be configured such that the trigger signal is an optical signal. Consequently, it is also possible to transmit the trigger signal with a delay time negligible in synchronization to the sub-controller slave arranged a far distance apart from the sub-controller master or even if a sampling frequency in the sensor units is high.

(7) The aspect of the invention may be configured such that the main controller and the plurality of sub-controllers are connected via a LAN (Local Area Network). The sub-controller slave can receive the start command from the main controller and can be set in a standby state for staying on standby for reception of the trigger signal.

Since the main controller and the plurality of sub-controllers are connected via the LAN, it is possible to transmit measurement data collected by the plurality of sub-controllers to the main controller via the LAN and manage the measurement data in a centralized manner. The sub-controller slave, which receives the start command from the main controller using the LAN, can be set in the standby state for staying on standby for reception of the trigger signal.

(8) The aspect of the invention may be configured such that the sensor unit includes an acceleration sensor and an angular velocity sensor. Consequently, it is possible to measure various kinds of information such as the movements, the postures, and the distortions in a plurality of places of an object to be detected (a human body, a mobile body, an immobile property, etc.) in synchronization.

(9) The aspect of the invention may be configured such that the synchronous measurement system includes a display section connected to the main controller. In an operation check mode carried out before measurement, an ID may be transmitted from the sensor unit in response to a command from the sub-controller. Error information of the sensor unit not responding to the command may be displayed on the display section by the main controller.

As explained above, a connection state of the main controller, the plurality of sub-controllers, and the plurality of sensor units, which is a precondition in performing synchronous measurement, can be checked and displayed on the display section by the main controller.

BRIEF DESCRIPTION OF THE DRAWINGS

FIG. 1 is a block diagram showing a synchronous measurement system according to an embodiment of the invention.

FIG. 2 is a block diagram showing a main controller shown in FIG. 1.

FIG. 3 is a block diagram showing a configuration common to a plurality of sub-controllers shown in FIG. 1.

FIG. 4 is a block diagram of a sensor unit shown in FIG. 1.

FIG. 5 is a timing chart showing a synchronous measurement operation.

FIG. 6A is a diagram showing data structures stored in memories of the sensor unit.

FIG. 6B is a diagram showing data structures stored in memories of the sub-controller.

FIG. 6C is a diagram showing data structures stored in memories of the main controller.

FIG. 7 is a diagram showing an error indication example in an operation check mode.

DESCRIPTION OF THE EMBODIMENTS

A preferred embodiment of the invention is explained in detail below. Note that the embodiment explained below does not unduly limit contents of the invention described in the appended claims. All of components explained in the embodiment are not always essential as means for solution of the invention.

1. Synchronous measurement system FIG. 1 shows a synchronous measurement system 1 according to this embodiment. In FIG. 1, the synchronous measurement system 1 includes a main controller 10 and a plurality of sub-controllers 20A to 20E connected to the main controller 10 via a LAN. A plurality of sensor units 30 are connected to each of the plurality of sub-controllers 20A to 20E.

The main controller 10 is, for example, a personal computer and includes a main body 11, a display section 12, a keyboard 13, and an Ethernet hub 14. The main controller 10 is installed with a synchronous measurement system execution program and controls synchronous measurement in the five sub-controllers 20A to 20E.

The plurality of sub-controllers 20A to 20E are connected to the Ethernet hub 14 of the main controller 10 by Ethernet cables 15. One of the plurality of sub-controllers 20A to 20E is a sub-controller master 20A. The other four sub-controllers are sub-controller slaves 20B to 20E connected to the sub-controller master 20A.

In this embodiment, the plurality of sub-controllers 20A to 20E are daisy chain-connected by, for example, optical communication cables 21. That is, the sub-controller slave 20B is connected to the sub-controller master 20A, the sub-controller slave 20C is connected to the sub-controller slave 20B, and the other sub-controller slaves are connected in series. Then, even if the number of sub-controller slaves increases, the sub-controller master and the plurality of sub-controller slaves only have to be connected in series. Cable laying and the like are easy compared with star type connection.

Each of the plurality of sub-controllers 20A to 20E includes a plurality of bus ports, for example, ten CAN (Controller Area Network) bus ports 22. Note that the CAN is a highly reliable communication form robust against an error and noise and is suitable for this embodiment in that a broadcasting command can be used. However, the bus ports may adopt other bus specifications and are not limited to the CAN. Maximum ten sensor units 30 are connected to the CAN bus cable 23 connected to each of the CAN bus ports 22. Since the ten CAN bus ports 22 are provided in each of the plurality of sub-controllers 20A to 20E, maximum one hundred sensor units 30 can be connected to each of the plurality of sub-controllers 20A to 20E. In this embodiment, maximum one hundred sensor units 30 are connected to each of the sub-controller master 20A and the four sub-controller slaves 20B to 20E. The entire system 1 includes maximum five hundred sensor units 30.

FIG. 2 is a block diagram showing the main controller 10. In FIG. 2, besides the display section 12 and the keyboard 13, a command generating section 102, a command decoder 103, a data processing section 104, a memory 105, a clocking section 106, a communication section 107, and the like are connected to a bus line of a CPU 101 provided in the main body 11 shown in FIG. 1. The Ethernet hub 14 shown in FIG. 1 is connected to the communication section 107. For example, when data from the sensor units 30 are collected, the command generating section 102 generates a data collection start command (hereinafter, start command). In an operation check mode before data measurement, the command generating section 102 generates, for example, a reset command as a check command. The command decoder 103 decodes end commands and the like transmitted from the sub-controllers 20A to 20E. The data processing section 104 is explained below.

FIG. 3 is a block diagram showing a configuration common to the plurality of sub-controllers 20A to 20E. A command generating section 202, a command decoder 203, a data processing section 204, a memory 205, a trigger transmitting section 206, a trigger receiving section 207, a counter 208, a first communication section 209, and a second communication section 210 are connected to a bus line of a CPU 201 provided in each of the sub-controllers 20A to 20E. The Ethernet cables shown in FIG. 1 are connected to ports of the first communication section 209. The CAN ports 22 shown in FIG. 1 are connected to the second communication section 210.

A light emitting section 211 is connected to the trigger generating section 206. A light receiving section 212 is connected to the trigger receiving section 207. The optical communication cable 21 is connected to the light emitting section 211 or the light receiving section 212, whereby a trigger signal, which is an optical signal, can be emitted or received. In the sub-controller master 20A, the optical communication cable 21 is connected to only the light emitting section 211. In the sub-controller slave 20E, the optical communication cable 21 is connected to only the light receiving section 212. Each of the sub-controllers 20A to 20E includes an optical switch 213 configured to divide the trigger signal received by the light receiving section 212 and input the trigger signal to the light emitting section 211. In each of the sub-controller slaves 20B to 20D, the optical switch 213 is turned on and the optical communication cable 21 is connected to both of the light emitting section 211 and the light receiving section 212. Consequently, each of the sub-controller slaves 20B to 20D can transfer the trigger signal from an upstream side to a downstream side. When the trigger signal is transferred, after the optical signal (the trigger signal) from the upstream side is received by the light receiving section 212 and converted into an electric signal, light is emitted again by the light emitting section 211. Therefore, the optical signal is waveform-shaped. When the trigger signal is transmitted as a digital electric signal, the trigger signal can be waveform-shaped by providing a buffer in the sub-controller slave. Consequently, synchronization accuracy is improved. As in the sub-controller slaves 20B to 20D, in the sub-controller master 20A, the switch 213 is turned on and the trigger signal output from the trigger transmitting section 206 is input to the trigger receiving section 207.

FIG. 4 shows a block diagram of the sensor unit 30. The sensor unit 30 is attached to an analysis target object and performs processing for detecting a given physical quantity. In this embodiment, as shown in FIG. 4, a sensor includes at least one, for example, a plurality of sensors 301x to 301z and 302x to 302z.

The sensor in this embodiment is a sensor configured to detect the given physical quantity and output a signal (data) corresponding to the magnitude of the detected physical quantity (e.g., acceleration, angular velocity, velocity, or angular acceleration). In this embodiment, the sensor includes a six-axis motion sensor including three-axis acceleration sensors 301x to 301z (an example of inertial sensors) configured to detect accelerations in X-axis, Y-axis, and Z-axis directions and three-axis gyro sensors (an example of angular velocity sensors and inertial sensors) configured to detect angular velocities in the X-axis, Y-axis, and Z-axis directions.

The sensor unit 30 can include, on a bus line of a CPU 303, a command generating section 304, a command decoder 305, a data processing section 306, and a communication section 307. The command decoder 305 decodes a synchronization command and a check command such as a reset command. The data processing section 306 processes measurement data of the sensors 301x to 301z and 302x to 302z into a data structure associated with an ID of the sensor unit 30 and outputs the data structure from the communication section 307. In this embodiment, any one of 1 to 10 is allocated to the ID of one sensor unit 30 connected to each of the CAN ports 22. However, the ID is not limited to this. For example, different IDs may be given to all of the one hundred sensor units 30. The data processing section 306 may perform processing for bias correction and temperature correction of the sensors 301x to 301z and 302x to 302z. Note that functions for the bias correction and the temperature correction may be incorporated in the sensor itself.

2. Synchronous measurement operation The operation in the synchronous measurement system 1 configured as explained above is explained. Measurement is started by operating the keyboard 13 of the main controller 10 shown in FIG. 1. The main controller 10 generates a start command in the command generating section 102. In the start command, the number of times of measurement N can be designated. The start command is transmitted to all the sub-controllers 20A to 20E via the communication section 107, the Ethernet hub 14, and the Ethernet cables 15 (FIG. 1) shown in FIG. 2. Accuracy of synchronization is not required in transmission of the start command from the main controller 10 to the plurality of sub-controllers 20A to 20E. In the start command, a measurement interval can be designated together with the number of times of measurement N.

Each of the sub-controllers 20A to 20E receives the start command in the first communication section 209 shown in FIG. 3 and decodes the start command in the command decoder 203. As shown in FIG. 5, the sub-controller master 20A generates, for example, a trigger signal, which is a digital signal, in the trigger transmitting section 206 according to the reception of the start command and outputs the trigger signal as an optical signal in the light-emitting section 211.

Since the switch 213 shown in FIG. 3 is on, the trigger signal transmitted by the trigger transmitting section 206 is input to the trigger receiving section 207 via the switch 213. The sub-controller master 20A receives, a trigger signal A (see FIG. 5).

On the other hand, each of the sub-controller slaves 20B to 20E receives the start command from the main controller 10 via the first communication section 209 and decodes the start command in the command decoder 203. Consequently, each of the sub-controller slaves 20B to 20E can be set in a standby state for staying on standby for reception of a trigger signal.

Thereafter, each of the sub-controller slaves 20B to 20E receives, in the light receiving section 212, the trigger signal from the sub-controller master 20A directly or via the sub-controller slaves on the upstream side and receives a trigger signal B to a trigger signal E in the trigger receiving section 207 (see FIG. 5). In this embodiment, a digital signal is transmitted by optical communication as the trigger signal. As shown in FIG. 5, synchronization timing can be taken by an edge of the trigger signal. Therefore, time deviation T1 from the issuance of the start command to the reception of the trigger signal A to the trigger signal E shown in FIG. 5 is in the order of several nS and can be neglected.

When the trigger signal is received in the trigger receiving section 207, each of the sub-controllers 20A to 20E generates a synchronization command in the command generating section 202 shown in FIG. 3 on the basis of the edge of the trigger signal. Each of the sub-controllers 20A to 20E transmits the synchronization command to the plurality of sensor units 30 from the second communication section 210 via the CAN ports 22 by broadcasting.

Each of the plurality of sensor units 30 connected to each of the sub-controllers 20A to 20E decodes, in the command decoder 305, synchronization commands A to E transmitted from the sub-controllers 20A to 20E (see FIG. 5). Time deviation T2 of the synchronization commands A to E shown in FIG. 5 is naturally larger than the time deviation T1 of the trigger signal A to the trigger signal E but is in the order of several microseconds and can be neglected.

The sensors 301x to 301z and 302x to 302z of the sensor unit 30 measure measurement data. The data processing section 306 outputs only data synchronizing with the synchronization command from the communication section 307 as a data structure of a predetermined format. In this embodiment, first data after the input of the synchronization command is output. The sub-controller 20A outputs first data after the input of the synchronization command A as data 1. Similarly, for example, the sub-controller 20E outputs first data after the input of the synchronization command E as the data 1. Note that, in this embodiment, each of the sensor units 30 is performing high-speed sampling. A sampling frequency of the sensor unit 30 is, for example, several KHz and a sampling interval is several hundred microseconds. In this embodiment, since T2 is several microseconds, accuracy of the synchronization trigger of this system is at a negligible level with respect to inter-sensor unit sampling synchronization performance of the sensor unit 30 itself. Note that the sensors 301x to 301z and 302x to 302z of the sensor unit 30 may start measurement in synchronization with the synchronization command.

As explained above, information concerning the number of times of measurement N and the measurement interval can be designated by the start command. When N is 2 or more, the sub-controller 20A repeatedly generates N trigger signals at every designated measurement interval (see FIG. 5). The sensor unit 30 outputs the measurement data 1 to N to the sub-controller 20A on the basis of each of the N trigger signals.

FIG. 6A shows a data structure 320 built by the data processing section 306 of the sensor unit 30. The data structure 320 is configured by an ID of the sensor unit 30 and six-axis data. The data processing section 306 adds the ID of the sensor unit 30 to data output from the sensors 301x to 301z and 302x to 302z.

FIG. 6B shows a data structure 220 built by the data processing section 204 of each of the sub-controllers 20A and 20B and stored in the memory 205. In the data structure 220, as shown in FIG. 6B, a number of the CAN port 22 and a count value of the synchronization command in the counter 208 are added to the data structure 320 output from the sensor unit 30 shown in FIG. 6A. Since the data is input to each of the sub-controllers 20A and 20B via the CAN port 22, according to the number of the CAN port 22 and an ID of the sensor unit 30 for each of the CAN ports 22, the sub-controller specifies which of the maximum one hundred sensor units 30 the sensor unit 30 is. The counter 208 shown in FIG. 3 is counted up every time the number of times N is set by the start command and, for example, the synchronization command is issued. By recording a count value of the counter 208, it is specified which of the synchronization commands shown in FIG. 5 the data follows.

When data corresponding to the Nth synchronization command is input to each of the sub-controllers 20A to 20E, the sub-controller issues, for example, an end command by the command decoder 203 and inputs the end command to the main controller 10. When the main controller 10 issues, for example, a data collection command, each of the sub-controllers 20A to 20E outputs the data stored in the memory 205 to the main controller 10.

FIG. 6C shows a data structure 120 built by the data processing section 104 of the main controller 10 and stored in the memory 105. In the data structure 120, as shown in FIG. 6C, a sub-controller ID is added to the data structure 220 output from each of the sub-controllers 20A to 20E shown in FIG. 6B. According to the data structure 120 shown in FIG. 6C, it is specified when the data is output from which of the five hundred sensor units 30 in total. Note that the sensor ID, the CAN port number, and the sub-controller ID shown in FIG. 6A to FIG. 6C are IDs for specifying the five hundred sensor units 30 in total and are not limited to hierarchically given IDs.

In order to adjust the data structure shown in FIG. 6C to resolution during an output, the data processing section 104 of the main controller 10 can multiply a numerical value of the six-axis data shown in FIG. 6C with a coefficient or calculate time corresponding to the count value in the counter 208 shown in FIG. 3 from the clocking section 106 shown in FIG. 2 and add the time to the data structure shown in FIG. 6C.

3. Error processing in the operation check mode or the like The synchronous measurement system 1 in this embodiment can carry out the operation check mode before data measurement. The main controller 10 transmits an operation check command to the sub-controllers 20A to 20E. Each of the sub-controllers 20A to 20E transmits, for example, a reset command to all the sensor units 30. The sensor unit 30 transmits an ID in response to the reset command from each of the sub-controllers 20A to 20E.

Consequently, error information of the sensor unit 30 not responding to the reset command can be displayed on the display section 12 by the main controller 10.

FIG. 7 shows an example of an error indication of the sensor unit 30. In FIG. 7, to correspond to each of the five sub-controllers 20A to 20E, display regions are provided by the number of the sensor units 30 connected to the sub-controller. A white indication indicates a normal sensor unit 30 and a black indication indicates the sensor unit 30 in which an error occurs. In the example shown in FIG. 7, an error is indicated in the sensor unit 30 of ID1 connected to the second CAN port 22 of the sub-controller 20. The error is considered to be caused by a connection failure of the sensor unit 30 alone. Further, in FIG. 7, an error is indicated in the sensor units 30 of ID1 to ID6 connected to the fifth CAN port 22 of the sub-controller 20D. The error is considered to be caused by a connection failure of the CAN bus cable 23 to the fifth CAN port 22.

As explained above, a connection state of the main controller 10, the plurality of sub-controllers 20A to 20E, and the plurality of sensor units 30, which is a precondition in performing synchronous measurement, can be checked and displayed on the display section 12 by the main controller 10. Therefore, an operator can shift to data measurement after correcting a connection failure.

In this embodiment, when an error occurs during measurement, processing is continued as much as possible and measurement data is stored in the main controller 10. For example, when the number of times of a data reception failure in which, for example, each of the sub-controllers 20A to 20E cannot receive data from the sensor unit 30 is equal to or larger than a fixed number, the sub-controller notifies the main controller 10 of an error only once and continues the processing. When each of the sub-controllers 20A to 20E detects that data cannot be received from a certain sensor unit 30, concerning the sensor unit 30, the sub-controller notifies the main controller 10 of an error only in the first detection and continues the processing.

When each of the sub-controllers 20A to 20E detects that data cannot be received from a certain CAN port 22, concerning the CAN port 22, the sub-controller notifies the main controller 10 of an error only in the first detection and continues the processing. When any one of the sub-controllers 20A to 20E cannot receive a trigger signal for a fixed time, the sub-controller notifies the main controller 10 of an error only once. When the main controller 10 receives the error notification, the main controller 10 forcibly stops the measurement processing.

When an error occurs in reading measurement data from any one of the sub-controllers 20A to 20E after the end of the measurement, the main controller 10 notifies the operator of an error together with a sub-controller name and reads data from the sub-controller from which the data can be normally read. The main controller 10 stores measurement data in the nonvolatile memory 205 in each of the sub-controllers 20A to 20E until the start of the next measurement.

The embodiment is explained in detail above. However, those skilled in the art could easily understand that various modifications are possible without substantively departing from the new matters and the effects of the invention. Therefore, all such modifications are regarded as being included in the scope of the invention. For example, the terms described at least once together with broader or synonymous different terms in the specification or the drawings can be replaced with the different terms. The configurations and the operations of the main controller, the sub-controller, the sub-controller master, the sub-controller slave, the sensor unit, and the like are not limited to those explained in the embodiment. Various modifications of the configurations and the operations are possible.

What is claimed is:

1. A synchronous measurement system comprising:
a main controller;
a plurality of sub-controllers connected to the main controller; and
a respective plurality of sensor units connected to each of the plurality of sub-controllers, wherein the plurality of sub-controllers include:
a sub-controller master; and
a sub-controller slave connected to the sub-controller master, the main controller transmits a start command to the sub-controller master and the sub-controller slave,
the sub-controller master includes
a first communication section that receives the start command from the main controller,
a first trigger transmitter that generates a trigger signal in response to receiving the start command, transmits the trigger signal to the sub-controller slave, and
a first command generating section that generates a first synchronization command upon generating the trigger signal,
wherein the plurality of sensor units connected to the sub-controller master is configured to sample data in accordance with the first synchronization command, and
the sub-controller slave includes
a second communication section that receives the start command from the main controller,
a second command decoder that decodes the start command, wherein the gab-controller slave is set in a standby state based on the start command prior to receiving, the trigger signal from the sub-controller master, and
a second command generating section that receives the trigger signal from the sub-controller master and generates a second synchronization command in response to the trigger signal, wherein the plurality of sensor units connected to the sub-controller master is configured to sample data in accordance with the second synchronization command.

2. The synchronous measurement system according to claim 1, wherein
the start command includes information concerning a number of times of measurement, and
the sub-controller master repeatedly generates the trigger signal by the number of times of measurement according to the reception of the start command.

3. The synchronous measurement system according to claim 2, wherein the start command includes information concerning a measurement interval.

4. The synchronous measurement system according to claim 1, wherein
a plurality of the sub-controller slaves are provided, and
the plurality of sub-controller slaves are connected to the sub-controller master in series.

5. The synchronous measurement system according to claim 1, wherein the trigger signal is a digital signal.

6. The synchronous measurement system according to claim 1, wherein the trigger signal is an optical signal.

7. The synchronous measurement system according to claim 1, wherein
the main controller and the plurality of sub-controllers are connected via a LAN, and
the sub-controller slave receives the start command from the main controller and is set in a standby state for staying on standby for reception of the trigger signal.

8. The synchronous measurement system according to claim 1, wherein the sensor unit includes at least one acceleration sensor and at least one angular velocity sensor.

9. The synchronous measurement system according to claim 1, further comprising a display section connected to the main controller, wherein
in an operation check mode carried out before measurement, an ID is transmitted from the sensor unit in response to a command from the sub-controller, and
error information of the sensor unit not responding to the command is displayed on the display section by the main controller.

* * * * *